United States Patent [19]

Jackson et al.

[11] Patent Number: 4,851,912
[45] Date of Patent: Jul. 25, 1989

[54] APPARATUS FOR COMBINING VIDEO SIGNALS

[75] Inventors: Richard A. Jackson, Nevada City; Kevin D. Windrem, Grass Valley, both of Calif.

[73] Assignee: The Grass Valley Group, Inc., Grass Valley, Calif.

[21] Appl. No.: 221,005

[22] Filed: Jul. 18, 1988

Related U.S. Application Data

[63] Continuation of Ser. No. 836,945, Mar. 6, 1986, abandoned.

[51] Int. Cl.$^4$ .......................................... H04N 5/275
[52] U.S. Cl. ................................................. 358/183
[58] Field of Search ................. 358/183, 22, 160, 166, 358/21 R, 171, 172

[56] References Cited

U.S. PATENT DOCUMENTS

| 3,673,324 | 6/1972 | Ito ........................................ 358/183 |
| 4,028,727 | 6/1977 | Skrydstrup ........................... 358/183 |
| 4,420,770 | 12/1983 | Rahman ............................... 358/183 |

OTHER PUBLICATIONS

Compositing Digital Images (Porter/Duff) 1984.

*Primary Examiner*—Tommy P. Chin
*Attorney, Agent, or Firm*—Francis I. Gray; John Smith-Hill

[57] ABSTRACT

A first shaped video signal $V_1K_1$ and a second shaped video signal $V_2V_2$, are combined so as to generate a third shaped video signal $V_3'$ given by $$V_3' = V_1 K_1 [1 - K_2(1 - P_{12})] + V_2 K_2 (1 - K_1 P_{12})$$

where $P_{12}$ is a priority signal. A key signal $K_3$ given by $$K_3 = 1 - (1 - K_1)(1 - K_2)$$

is also generated. An output processor receives the shaped video signal $V_3'$, the key signal $K_3$ and a matte signal $M_3$. In a first mode of operation, the output video signal $V_3''$ of the output processor is given by $$V_3'' = V_3 + M_3(1 - K_3)$$

and the key signal $K_3'$ that is generated by the output processor has a constant value, and in a second mode of operation of the output processor the output video signal is given by $$V_3'' = V_3'/K_3$$

and the key signal $K_3'$ is directly proportional to $K_3$.

11 Claims, 4 Drawing Sheets

APPARATUS FOR COMBINING VIDEO SIGNALS

This is a continuation of application Ser. No. 836,945, filed Mar. 6, 1986, and now abandoned.

This invention relates to apparatus for combining video signals.

BACKGROUND OF THE INVENTION

In a video mixer, two video signals $V_1$ and $V_2$ (FIG. 1) are multiplied by a key signal $K_1$ (having a range of values from 0 to 1) and its complement $(1-K_1)$ respectively, and the two signals $V_1K_1$ and $V_2(1-K_1)$ are additively combined in a summer to produce a composite output signal $V_q$ having the form $V_1K_1+V_2(1-K_1)$. When the key signal $K_1$ is zero, the input signal $V_1$ makes no contribution to the signal $V_q$, regardless of the value of $V_1$. Similarly, if $K_1$ is one, the signal $V_2$ makes no contribution to the signal $V_q$. The proportion of the signal $V_q$ that is contributed by $V_1$ determines the opacity with which the scene represented by the signal $V_1$ is perceived in the composite picture. If $K_1$ is one, i.e., $V_1$ represents 100% of the signal $V_q$, then the $V_1$ scene (the scene represented by the signal $V_1$) completely obscures the $V_2$ scene, regardless of the value of $V_2$. As $K_1$ decreases, the extent to which the $V_2$ scene is obscured in the composite picture is reduced until, when $K_1$ reaches zero, the $V_2$ scene is opaque and completely obscures the $V_1$ scene. Thus, the coefficients $K_1$ and $(1-K_1)$ determine the relative opacity of the two component scenes: if the coefficient $K_1$ is greater than $(1-K_1)$, then the $V_1$ scene at least partially obscures the $V_2$ scene and appears, to a viewer of the composite scene, to be in front of the $V_2$ scene.

The multiplication of the signals $V_1$ and $V_2$ by the key signal $K_1$ and its complement $(1-K_1)$ is shown in FIG. 1, in which it is assumed that all signals have five discrete values in the range from zero to unity and have sharp transitions between levels. It will, of course, be appreciated that FIG. 1 is in fact very much simplified, and that in the case of analog signals the range of possible values is continuous, and that transitions for either analog or digital signals would have a finite slew rate.

A video signal $V_1'$ is said to be a "shaped" video signal when it is the multiplication product of an unshaped video signal $V_1$ and an associated key signal $K_1$. In general, there is no necessary relationship between the video signal and its associated key signal. A production switcher normally receives unshaped video signals and their associated key signals and provides a full screen video signal at its output. No key output is produced.

Shaping has two aspects, namely spatial or X-Y shaping (only the X-dimension is shown in FIG. 1), which determines the area of the composite picture to which the component signal makes a contribution (when $K_1=0$, the signal $V_1$ makes no contribution to the signal $V_q$), and opacity or Z shaping, which determines, for $K_1$ greater than zero, the magnitude of the contribution that is made by the component signal to the composite signal $V_q$. The shaping of the component signals is discussed in terms of "coverage" in Porter, T. and Duff, T., "Compositing Digital Images", Computer Graphics, Vol. 18, No. 3 (1984), pages 253 to 259.

The foregoing discussion of the manner of production of the signal $V_q$ is based on the assumption that the signal $V_2$ is a full field signal, i.e. that the key signal $K_2$ associated with the video signal $V_2$ is one for all locations. In the general case, $K_2$ is not one for all locations and $$V_q=V_1K_1+V_2K_2(1-K_1)$$

It will be seen from this more general expression that the video signal $V_q$, being the weighted sum of two shaped video signals $V_1K_1$ and $V_2K_2$, is itself a shaped video signal. For the sake of consistency in notation, the shaped signal that has previously been designated $V_q$ will hereafter be designated $V_q'$, and $V_q$ will hereafter be used to designate the corresponding unshaped signal.

The key signal $K_q$ that relates $V_q'$ to $V_q$ is given by $$K_q=1-(1-K_1)(1-K_2)$$

If, for every location, either $K_1$ or $K_2$ is one, then $K_q=1$ for all locations. In particular, if either $V_1$ or $V_2$ is a full field signal, the signal $V_q'$ is a full field signal. If, on the other hand, $V_q'$ is not a full field signal it might be desired to form a composite scene from the scenes represented by the signal $V_q'$ and, e.g., a background scene represented by a signal $V_r$ having an associated key signal $K_r$. In such a case, the signal $(1-K_q)$ would be used to process the signal $V_r$ in a production switcher, and an output signal $V_s'=V_q'+V_rK_r(1-K_q)$ would be produced. Generally, $V_r$ would be a full field signal and so $K_r=1$ and $V_s'=V_q'+V_r(1-K_q)$.

Recalling that $V_q'=V_1K_1+V_2K_2(1-K_1)$, if $K_1=1$, then $V_q'=V_1$, i.e. the signal $V_2$ makes no contribution to the signal $V_q'$, regardless of the value of $K_2$. Therefore, combining of the video signals $V_1$ and $V_2$ is under the primary control of the key signal $K_1$. Similarly, if the signal $V_q'$ were equal to $V_1K_1(1-K_2)+V_2K_2$, the combining would be under the primary control of the signal $K_2$, and if $K_2=1$, then $V_q'=V_2$ and $V_1$ makes no contribution regardless of the value of $K_1$. The two different situations are equivalent respectively to the $V_1$ scene and the $V_2$ scene being in the foreground of the composite scene. However, the conventional mixer does not allow the operator to control on a dynamic basis whether the mixing operation is under the primary control of the signal $K_1$ or of the signal $K_2$.

SUMMARY OF THE INVENTION

In a preferred embodiment of the invention, first and second shaped video signals $V_1'$ and $V_2'$ are combined in accordance with associated first and second key signals $K_1$ and $K_2$ and a priority signal $P_{12}$, by generating a third shaped video signal $V_3'$ which is given by $$V_3'=V_1'[1-K_2(1-P_{12})]+V_2'(1-K_1P_{12})$$

and a third key signal $K_3$ which is given by $$K_3=1-(1-K_1)(1-K_2).$$

The value of the priority signal $P_{12}$ determines the relative weighting given to the key signals $K_1$ and $K_2$ in forming the third video signal $V_3'$, and this in turn determines whether the scenes represented by the component signals $V_1$ and $V_2$ are perceived in the composite picture as representing foreground objects or background objects. The priority signal $P_{12}$ may be varied over several frames of the video signals, so that the background objects appear to pass through the foreground objects and become foreground objects themselves. In a split-screen effect, by having a change in the value of the priority signal $P_{12}$ occur at the split, objects that appear to be in the foreground on one side of the composite image can be made to appear in the background on the other side of the composite image, and vice-versa.

It will be appreciated that in the context of the present invention, references to component video signals are intended to relate to signals that represent different scenes, and that references to a composite video signal are intended to relate to a signal that represents a scene formed by combining two or more scenes, as represented by respective component video signals.

BRIEF DESCRIPTION OF THE DRAWINGS

For a better understanding of the invention, and to show how the same may be carried into effect, reference will now be made, by way of example, to the accompanying drawings in which.

DETAILED DESCRIPTION

Figure 1:
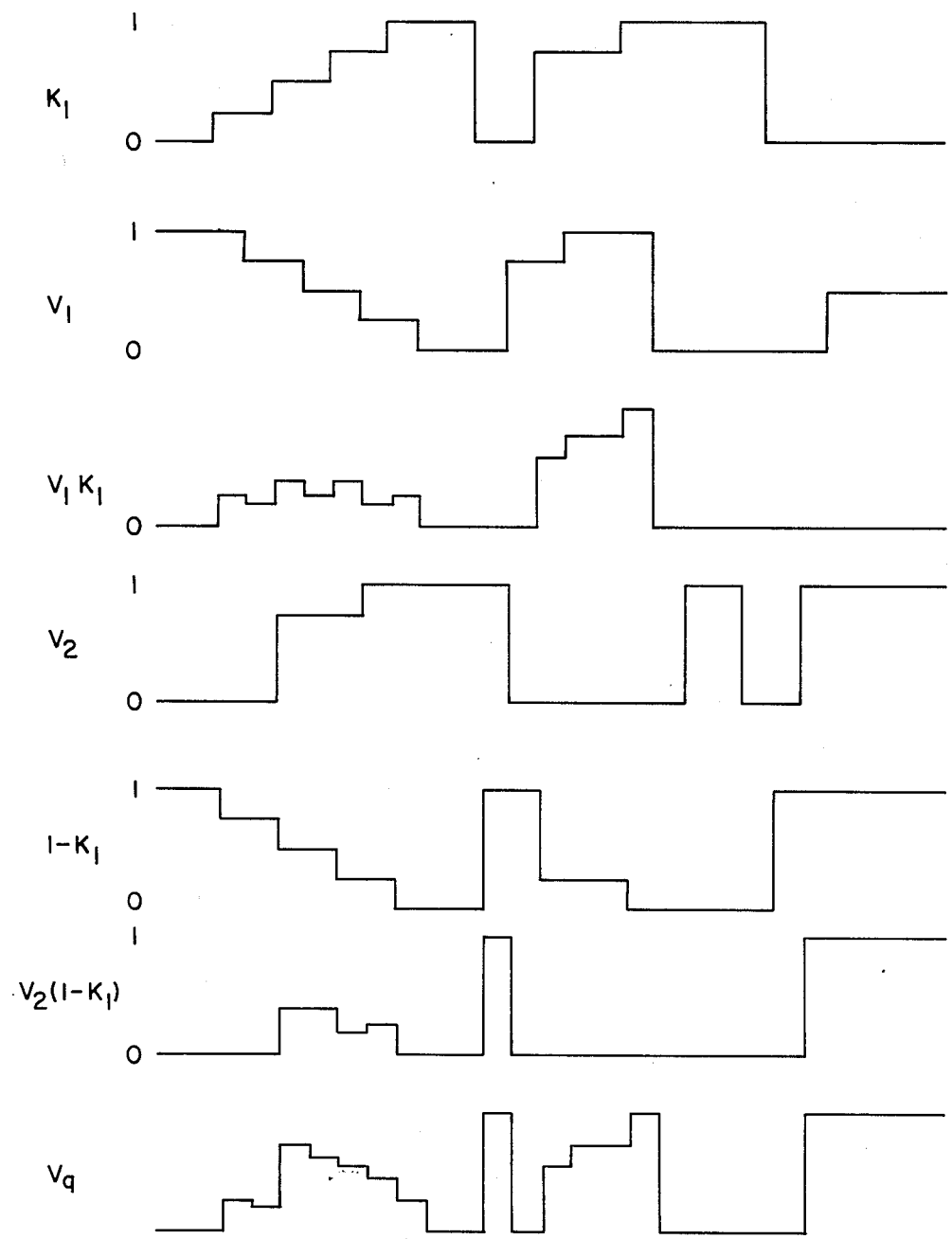
FIG. 1 shows waveforms to illustrate combining of video signals.
Figure 2:
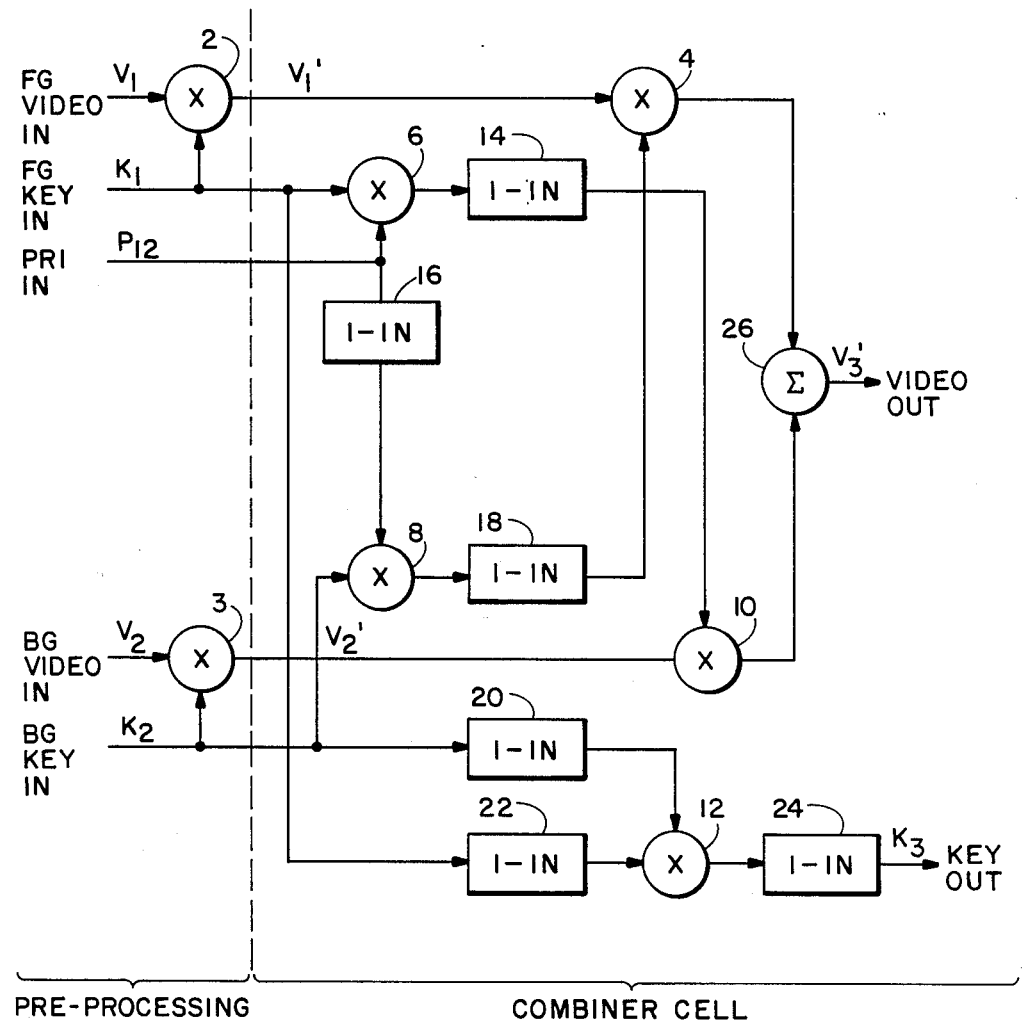
FIG. 2 is a block diagram of a combiner cell for combining first and second component video signals.

The combiner cell shown in FIG. 2 comprises multipliers 4, 6, 8, 10 and 12, complement circuits 14, 16, 18, 20, 22 and 24, and a summer 26. The illustrated combiner cell operates in the digital domain with parallel data, and therefore all the signal lines that are illustrated would in fact be multiple conductor lines. Additional circuitry would be required to assure proper timing relationships among the various signals, but such matters are well within the skill of the art and therefore are not shown and will not be further described.

The input signals of the combiner cell comprise two shaped video signals $V_1'$ and $V_2'$, associated key signals $K_1$ and $K_2$, and a priority signal $P_{12}$. The levels of the key signals $K_1$ and $K_2$ and the level of the priority signal $P_{12}$ are normalized to have maximum and minimum values that can be represented numerically as 1 and 0. Also, the video signals $V_1'$ and $V_2'$ gave the same maximum and minimum values. Additional multipliers 2 and 3 are provided upstream of the combiner for generating the shaped video signals $V_1'$ and $V_2'$ from unshaped video signals $V_1$ and $V_2$ and the associated key signals $K_1$ and $K_2$. The combiner cell provides a shaped output video signal $V_3'$ and an output key signal $K_3$. It can readily be seen that the output video signal is given by the equation $$V_3' = V_1'[1-K_2(1-P_{12})] + V_2'(1-K_1P_{12})$$

and that the output key signal is given by $$K_3 = 1-(1-K_1)(1-K_2).$$

The value of $P_{12}$ determines the weighting factors that are applied to the two video signals $V_1'$ and $V_2'$. If $P_{12}$ is equal to zero, this implies that the $V_2$ scene is in the foreground of the composite scene and that the $V_1$ scene is in the background, and vice versa if $P_{12}$ is equal to one.

For $P_{12}=0$, then $$V_3' = V_1'(1-K_2) + V_2'$$

The value of $K_2$ defines areas in which the $V_2$ scene contributes to the composite scene. If $K_2=1$, the contribution of $V_1$ to the composite scene is zero and therefore the $V_2$ scene completely obscures the $V_1$ scene. If $K_2=0$, $V_2'=0$ and therefore there is no contribution from $V_2$ and $V_1$ is allowed to pass to $V_3'$ unaltered.

For $P_{12}=1$, then $$V_3' = V_2'(1-K_1) + V_1'$$

The value of $K_1$ defines areas in which the $V_1$ scene contributes to the composite scene. If $K_1=1$, the contribution of $V_2$ to the composite scene is zero and therefore the $V_1$ scene completely obscures the $V_2$ scene. If $K_1=0$, there is no contribution from $V_1$ and $V_2$ is allowed to pass to $V_3'$ unaltered.

For $P_{12}=0.5$, then $$V_3' = V_1'(1-K_2/2) + V_2'(1-K_1/2)$$

Where $K_2=0$, $V_1'$ is passed unaltered; where $K_1=0$, $V_2'$ is passed unaltered; and where $K_2>0$ and $K_1>0$, the relative opacities of the $V_1$ and $V_2$ scenes are determined by the ratio of $K_1$ and $K_2$.

As $P_{12}$ increases from zero the relative depths of the $V_1$ and $V_2$ pixels in the composite image change, from the $V_2$ pixel appearing in front of the $V_1$ pixel, through the two pixels appearing to be at the same depth (at $P_{12}=0.5$), to the $V_1$ pixel appearing in front of the $V_2$ pixel. It will therefore be seen that the priority signal $P_{12}$ makes it possible to determine which of the component scenes will appear as the foreground scene in the composite picture. By changing the value of $P_{12}$, the composite picture can be changed so that a component scene is the foreground scene at one time and is the background scene at another time.

Figure 3:
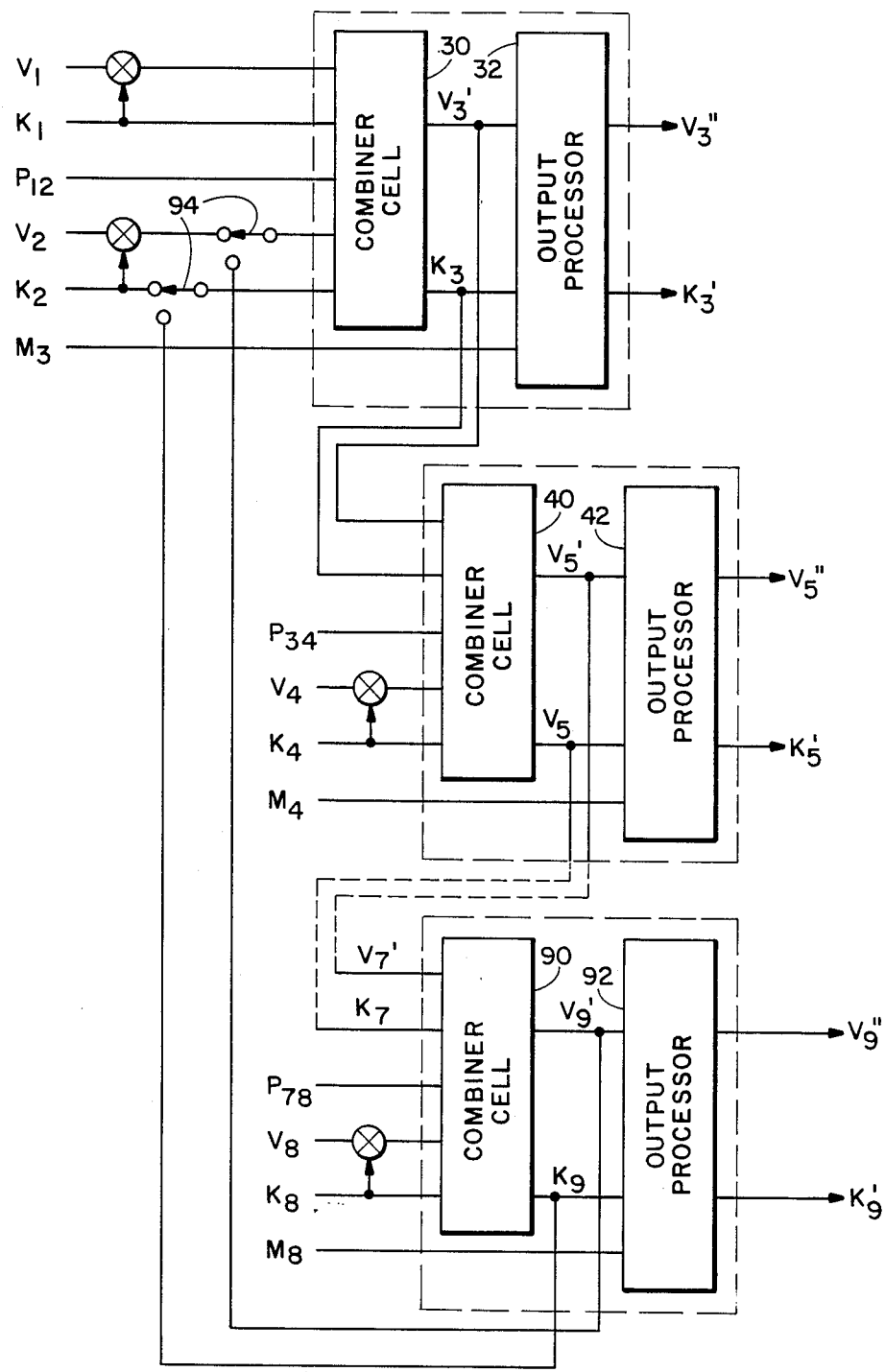
FIG. 3 is a block diagram of a combiner system comprising several combiner cells connected in a cascade arrangement.

Several combiner cells 30, 40 . . . 90 of the kind shown in FIG. 2 may be connected in cascade, as shown in FIG. 3, to form a combiner system. Output processors 32, 42 . . . 92 are associated with the combiner cells respectively, for a reason which will be explained below. The output signals from the output processors are connected to a production switcher.

Conventional production switchers are designed to receive unshaped video signals and their associated key signals, and multiply the video signals by their key signals to produce shaped video signals that are combined with other shaped video signals, e.g., a signal generated by a digital video effects unit, to produce a final program video signal representing the desired composite picture. The output video signals provided by the combiner cells are already shaped by their respective key signals. If the signal $V_3'$, for example, is applied to a conventional production switcher it will be shaped a second time, and the result will be a black halo in the scene represented by the signal $V_3'$ for values of $K_3$ greater than zero and less than unity. The output processors are interposed between the combiner cells and the production switcher in order to generate unshaped video signals from the shaped video signals generated by the combiner cells.

Figure 4:
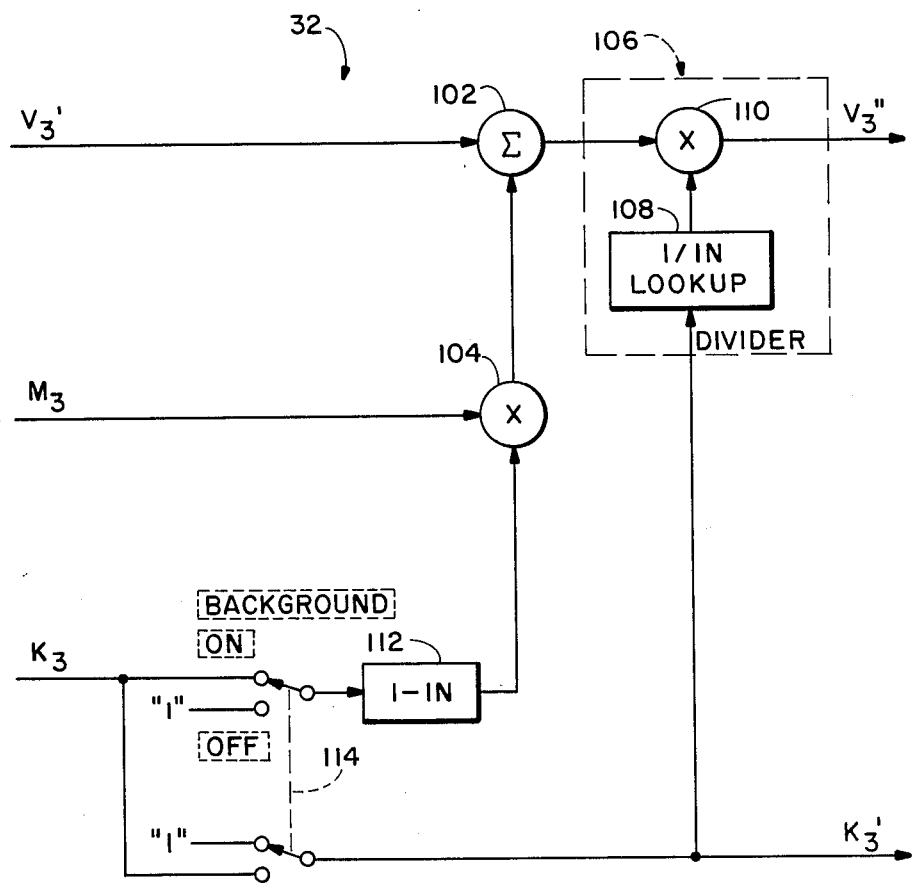
FIG. 4 is a block diagram of an output processor for a combiner cell.

FIG. 4 shows the output processor associated with the combiner cell 30. The other output processors are identical. As shown in FIG. 4, the output processor 32 receives the shaped video signal $V_3'$ and the key signal $K_3$ from the associated combiner cell 30, and also receives a video matte signal $M_3$. The signal $M_3$ represents a background for the $V_3$ scene. The background may be, for example, a plain, solid color. The output processor comprises a summer 102, a multiplier 104, a divider 106 (implemented as a reciprocal look-up table 108 and a multiplier 110) and a complement circuit 112. In addition, the processor comprises a switch 114 for selecting one of two operating modes for the processor. The processor provides a composite output video signal $V_3''$ and a composite output key signal $K_3'$, which are applied as input signals to the production switcher.

In the first mode of operation of the processor (background on), the signal $V_3''$ is given by $$V_3'' = V_3' + A$$

where $A = M_3(1-K_3)$ so that $$V_3'' = V_3' + M_3(1-K_3).$$

Thus, for any pixel for which $K_3$ is zero, $V_3' = 0$ and $V_3'' = M_3$. If $K_3$ is not zero, indicating that $V_3'$ is nonzero, the relative contribution of $V_3'$ to $V_3''$ depends on the value of $K_3$, and it can be seen that for $K_3 = 1$, $M_3$ is not permitted to make a contribution and $V_3'' = V_3'$. The output key signal to inhibit the production switcher from attempting to add another background.

In the second mode of operation (background off), the output key signal $K_3'$ is equal to $K_3$, and the production switcher will then add background to pixels for which $K_3'$ is not 1.0 in proportion to the value of $(1-K_3)$. The production switcher will multiply $V_3''$ by $K_3'$. Since $K_3'$ is equal to $K_3$, it is desired for the reason indicated above that $V_3''$ not be equal to $V_3'$. Therefore, in the second mode the output signal $V_3'$ from the summer 102 is divided by the key signal $K_3$, so that $$V_3'' = V_3'/K_3.$$

Therefore, the signal $V_3''$ is equal to $V_3$ (which does not actually exist), and the switcher may multiply the signal $V_3''$ by $K_3'$ (which is equal to $K_3$) and produce the desired signal $V_3'$ at the switcher output. For pixels at which $K_3$ is close to zero, $V_3''$ is indeterminate, but this is not important to the final program video signal because these pixels make no contributiion to that signal.

It will be appreciated that the invention is not restricted to the particular apparatus that has been described and illustrated, and that variations may be made therein without departing from the scope of the invention as defined in the appended claims, and equivalents thereof. For example, instead of using interdependent processing circuits for generating, from $K_1$, $K_2$ and $P_{12}$, the multiplication factors for the video signals $V_1$ and $V_2$, these multiplication factors may be generated independently, as mix constants that are separately applied to the multipliers of a signal mixer that is of otherwise conventional form. It is not necessary that each combiner cell of the system shown in FIG. 3 should have its own output processor, since if the output is always to be taken from the same combiner cell, it is necessary only that an output processor be associated with the combiner cell. In a preferred implementation of the invention, the key and video output signals of the last combiner cell in the cascade are connected as inputs to the first combiner cell, so as to establish a closed ring. This provides additional flexibility, in that the ring can be logically broken at any point, allowing additional priority combinations. For example, in the arrangement shown in FIG. 3 the signal $V_4'$ can only be combined with the composite signal $V_1'/V_2'$, and the component signal $V_9'$ can only be combined with the composite signal $V_1'/\ldots/V_8'$. The scene represented by the signal $V_9'$ cannot be made to appear behind the $V_1$ scene but in front of the $V_4$ scene. However, if the switches 94 are operated so that the output signals $V_9'$ and $K_9$ are applied to the combiner cell 30 in lieu of the input signals $V_2'$ and $K_2$, and $P_{12}$ and $P_{34}$ are set to unity, the desired composite signal would be provided at the output of the output processor 42 ($V_5''$, $K_5'$). The key signal $K_8$ must be forced to zero inside the combiner cell 90.

It will also be appreciated that although the preferred embodiment of the invention, described above with reference to the drawings, is implemented using parallel digital data, it could also be implemented using serial digital data or analog data.

We claim:

1. Apparatus for combining a first shaped video signal $V_1K_1$ and a second shaped video signal $V_2K_2$ in accordance with a priority signal $P_{12}$, comprising:
   means for generating from said first and second shaped video signals and said priority signal a third shaped video signal $V_3'$ given by $$V_3' = V_1K_1(1-K_2(1-P_{12})) + V_2K_2(1-K_1P_{12})$$

where $V_1$ is a first unshaped video signal, $V_2$ is a second unshaped video signal, $K_1$ is a first key signal associated with the first unshaped video signal and $K_2$ is a second key signal associated with the second unshaped video signal; and
   means for generating from the first and second key signals a third key signal $K_3$ given by $$K_3 = 1 - (1-K_1)(1-K_2).$$

2. Apparatus according to claim 1, further comprising an output processor for receiving the third shaped video signal $V_3'$ and the third key signal $K_3$, said output processor being operative in a first mode to generate an output signal $V_3''$ given by $$V_3'' = V_3' + A$$

where $A$ is a function of the third key signal and is independent of $V_3'$, and a key signal $K_3'$ having a constant value.

3. Apparatus according to claim 2, wherein the output processor is operative in a second mode to provide the output signal $V_3''$ as a function that is directly proportional to the ratio of $V_3'/K_3$, and the key signal $K_3'$ as a function that is directly proportional to the third key signal $K_3$.

4. Apparatus according to claim 2, wherein the output processor has an input terminal for receiving a matte signal $M_3$ and is operative in the first mode to generate the output video signal $V_3''$ where $$A = M_3(1-K_3).$$

5. A processing circuit for receiving a shaped video signal $V_3'$ and an associated key signal $K_3$ and providing output signals in response thereto, said processing circuit having at least a first mode of operation and comprising means operative in the first mode of the processing circuit to generate from the shaped video signal and the associated key signal an output video signal $V_3''$ as one of the output signals given by $$V_3'' = V_3' + A$$

where A is a function of the associated key signal and is independent of $V_3'$, and an output key signal as another of the output signals having a constant value.

6. A processing circuit according to claim 5, having a second mode of operation, and wherein the operative means in the second mode generates the output video signal $V_3''$ according to $$V_3'' = CV_3'/K_3$$

where C is a constant, and the output key signal having a value that is directly proportional to the associated key signal $K_3$.

7. A processing circuit according to claim 5, further comprising an input terminal for receiving a matte signal $M_3$ such that in the first mode the operative means generates the output video signal $V_3''$ where $$A = M_3(1 - K_3).$$

8. A combiner system for combining more than two shaped video signals with respective associated key signals and a plurality of priority signals comprising:
 a plurality of combiner cells, each combiner cell having as inputs two of said shaped video signals and their respective associated key signals together with one of the priority signals and having as outputs an output shaped video signal and an associated output key signal, the combiner cells being connected in cascade such that the output shaped video signal and the associated output key signal form one of the shaped video signals and its respective associated key signal input to the succeeding combiner cell; and
 a plurality of output processors, one for each of the combiner cells, having as inputs the output shaped video signal and its associated output key signal from the respective combiner cells and having as outputs an unshaped video signal and an associated key signal output.

9. A combiner system as recited in claim 8 further comrising means for applying the outputs from the last combiner cell in the cascade to the inputs of the first combiner cell in the cascade in lieu of one of the shaped video signals and associated key signal to establish a closed ring.

10. A combiner system for combining more than two shaped video signals with respective associated key signals and a plurality of priority signals comprising:
 a plurality of combiner cells, each combiner cell having as inputs two of said shaped video signals and their respective associated key signals together with one of the priority signals and having as outputs an output shaped video signal and an associated output key signal, the combiner cells being connected in cascade such that the output shaped video signal and the associated output key signal form one of the shaped video signals and its respective associated key signal input to the succeeding combiner cell; and
 an output processor having as inputs the output shaped video signal and its associated output key signal from a predetermined one of the combiner cells and having as outputs an unshaped video signal and an associated key signal output.

11. A combiner system as recited in claim 10 further comprising means for applying the outputs from the last combiner cell in the cascade to the inputs of the first combiner cell in the cascade in lieu of one of the shaped video signals and its associated key signal to establish a closed ring.

* * * * *